C. C. REYNOLDS.
Thrashing Machine.
No. 68,574.
Patented Sept. 3, 1867.
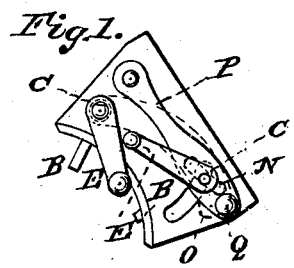
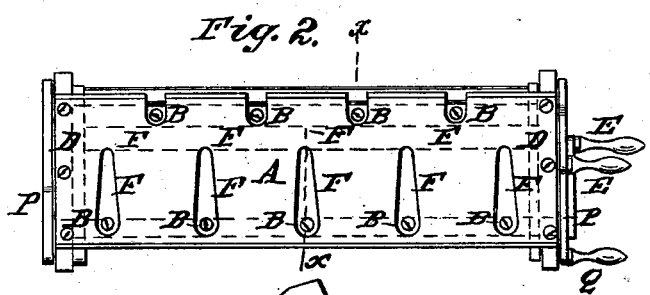
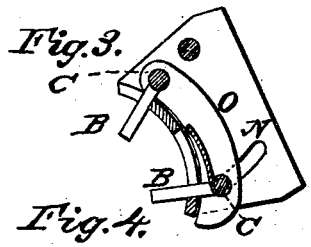
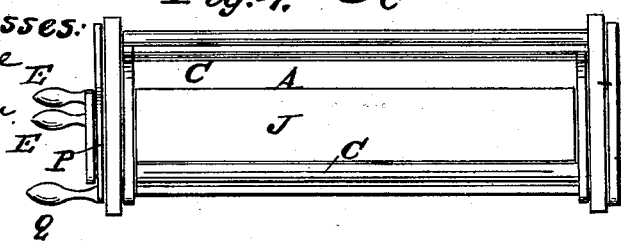
Witnesses:
Theo Tusche
Wm Trewin
Inventor:
C C Reynolds
Per Munn & Co
Attorneys

United States Patent Office.

C. C. REYNOLDS, OF NEW YORK, N. Y.

Letters Patent No. 68,574, dated September 3, 1867.

---

IMPROVEMENT IN THRESHING MACHINES.

---

The Schedule referred to in these Letters Patent and making part of the same.

---

TO ALL WHOM IT MAY CONCERN:

Be it known that I, C. C. REYNOLDS, of the city, county, and State of New York, have invented a new and useful Improvement in Concaves for Grain-Threshing Machines; and I do hereby declare that the following is a full, clear, and exact description thereof, which will enable others skilled in the art to make and use the same, reference being had to the accompanying drawings, forming part of this specification.

The present invention consists in a novel manner of hanging and arranging the teeth of the concave in a grain-threshing machine, whereby they can be set either further in or out according as may be found necessary, or swung or moved out of action without requiring to be detached from the concave. In the accompanying plate of drawings my improvement in concaves for grain-threshing machines is illustrated—

Figure 1 being a view of one end of the concave.

Figure 2, a face view of the same.

Figure 3, a transverse vertical section taken in the plane of the line $xx$ fig. 1; and Figure 4, a view of rear side of concave.

Similar letters of reference indicate corresponding parts.

A, in the drawings, represents the concave, which in its general shape and construction may correspond to any of the concaves now in common use for grain-threshing machines. B, the teeth to the concave, which in lieu of being fixed to the concave are fastened to spindles or shafts, C, one for each row of teeth. These shafts extends outside of the concave for its whole length, turning in suitable bearings of each of its head or end plates D, and at one end are each provided with a crank-handle, E, suitable for turning them, so as to swing the teeth either in or out, (more or less,) of the concave, the teeth playing through suitable-shaped openings F made in the concave at the proper points therefor. In order to draw the teeth straight through the concave to a greater or lesser extent, according as may be found most desirable in the running of the threshing machine, I hang the shaft to which they are secured in longitudinal curved-shaped bearings of the end plates of the concave, in combination with suspending them in elongated bearings N of the outer ends O of arms P, hung by a pivot at the other ends so as to swing upon the head-plates. Q, a crank-handle, secured to one of the swinging arms P for convenience in turning, and thus, through their elongated bearings, and those of the end plates drawing in or throwing out, the teeth attached to the concave shaft, either more or less in or out of the concave, as the case may be, and in straight lines with their length. R, a cover or lid, shown as secured to one of the toothed shafts, for the purpose of closing the openings through the concave provided for the teeth of such shaft when those teeth are in position for operation.

I claim as new, and desire to secure by Letters Patent—

Hanging the teeth to the concave of grain-threshing and other machines, that they can be swung in and out of position, substantially as described.

C. C. REYNOLDS.

Witnesses:
WM. F. McNAMARA,
ALBERT W. BROWN.